W. M. TEMPLE.
HORSESHOE.
No. 191,785. Patented June 12, 1877.
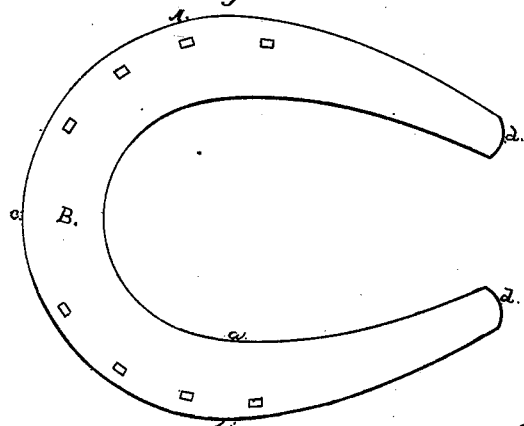
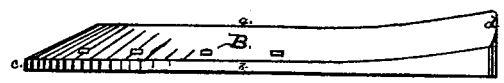
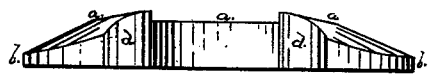
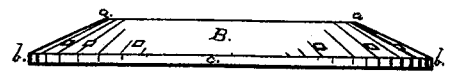
Witnesses:
H. S. Monroe.
T. I. Lacey.
Inventor;
William M. Temple
Per Atty. J. C. Robie

UNITED STATES PATENT OFFICE.

WILLIAM M. TEMPLE, OF PORT DICKENSON, NEW YORK.

IMPROVEMENT IN HORSESHOES.

Specification forming part of Letters Patent No. 191,785, dated June 12, 1877; application filed April 28, 1877.

*To all whom it may concern:*

Be it known that I, WILLIAM M. TEMPLE, of Port Dickenson, in the county of Broome and State of New York, have invented a new and useful Improvement in Horseshoes; which improvement is fully set forth in the following specification, reference being had to the accompanying drawings.

This invention relates to the construction of a horseshoe that shall prevent the contraction of the hoof, and expand it when required; and consists in forming the entire bearing of the shoe upon the hoof equally, without reference to outside attachments, in such a manner as to prevent the contraction of said hoof, or to restore it to its natural form when contracted from whatever cause, without inconvenience to the horse, when the shoe may be modified by diminishing the angle of the bevel so as to prevent further tendency to any change in the natural conformation of the foot.

Figure 1 in the accompanying drawings is a plan view of a shoe embodying my invention, showing the inside bearing-surface on the hoof. Fig. 2 is a longitudinal side elevation of the same. Fig. 3 is a heel end view, and Fig. 4 the toe-end elevation of the same, all showing the entire bevel of the surface from heel to toe.

A is the blank shoe, the working surface of which is made in the ordinary form, having nail-holes and grooves for the reception of the heads of the nails and the usual calks. B is the inside or hoof bearing-surface, which, for the common hoof, is made slightly beveling or convex from the sole $a$ to the edge $b$, and from the toe $c$ to the heel $d$, leaving the entire surface in a convex form, which, when properly fitted, prevents the contraction of the hoof and allows unusual ease and convenience to the movements of the horse. The ordinary shoe is usually made flat or slightly beveling from the outer edge to the sole of the foot, which renders it liable to gradually contract the hoof, and occasion much inconvenience and ultimate disease of the foot.

When the hoof is so much contracted as to partially cripple the animal, the angle of the bevel is increased, which facilitates the process of expansion and soon gives relief. I prefer, however, when practicable, to generally expand the contraction, which leaves the hoof in a more serviceable condition.

The thick part of the shoe may be fitted to within a sixteenth of an inch of the sole, which prevents the accumulation of earth or snow.

I am aware that horseshoes have been constructed having beveled bearing-points, in connection with "beveled calks" and other attachments, which are liable to expand the hoof unequally, while my improvement restores it to its natural conformation, owing to the equal bearing-surface of the shoe.

Having thus described my invention, what I claim as new, and desire to secure by Letters Patent, is—

The horseshoe A, having a convex or beveled bearing on the entire bearing part of the hoof, constructed in the specific manner herein described and shown, for the purpose set forth.

WILLIAM M. TEMPLE.

Witnesses:
P. P. ROGERS,
J. C. ROBIE.